(12) United States Patent
King et al.

(10) Patent No.: US 7,359,362 B2
(45) Date of Patent: Apr. 15, 2008

(54) CONTROL OF A MULTI-SECTORED ANTENNA SYSTEM TO IMPROVE CHANNEL EFFICIENCY

(75) Inventors: Wayne G. King, Stirling (AU); Craig Steven Ranta, Redmond, WA (US); Edward C. Giaimo, III, Bellevue, WA (US); James Brennan, Sammamish, WA (US); Stephen M. Stegner, Bothell, WA (US); David William Russo, Woodinville, WA (US); Chris A. Murzanski, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 11/045,533

(22) Filed: Jan. 28, 2005

(65) Prior Publication Data

US 2006/0171357 A1     Aug. 3, 2006

(51) Int. Cl.
*H04Q 7/24* (2006.01)
(52) U.S. Cl. ............... 370/338; 370/334; 370/352; 455/562.1; 455/418; 343/702
(58) Field of Classification Search ............ 370/338, 370/334, 352; 455/562.1, 418; 343/702, 343/709; 342/359
See application file for complete search history.

(56) References Cited

U.S. PATENT DOCUMENTS

| | | | |
|---|---|---|---|
| 4,298,873 A | 11/1981 | Roberts | |
| 4,521,781 A | 6/1985 | Campi et al. | |
| 5,303,240 A * | 4/1994 | Borras et al. | 370/347 |
| 6,281,838 B1 | 8/2001 | Hong | |
| 6,292,134 B1 | 9/2001 | Bondyopadhyay | |
| 6,339,712 B1 | 1/2002 | Toivola | |
| 6,349,218 B1 | 2/2002 | Nakagawa et al. | |
| 6,522,897 B1 | 2/2003 | Martek et al. | |
| 6,661,378 B2 | 12/2003 | Bloy | |
| 6,741,207 B1 | 5/2004 | Allison et al. | |
| 6,757,553 B1 | 6/2004 | English | |
| 7,068,220 B2 | 6/2006 | DeNatale et al. | |
| 7,170,873 B1 | 1/2007 | Cisar et al. | |

(Continued)

OTHER PUBLICATIONS

Sierra Wireless and Sprint PCS Deliver New Wireless Internet Solution, http://www.sierrawireless.com/news_events/news.aspx?year=2000&contentid=6A91F6A5-7193-4923-80B7-0EC323E7A60C, Aug. 23, 2000.

(Continued)

*Primary Examiner*—Danh Le
(74) *Attorney, Agent, or Firm*—Workman Nydegger

(57) ABSTRACT

A wireless device is coupled to a multi-sector antenna that includes a plurality of different sectors, any of which can be activated to transmit and receive in a desired direction specific to that sector. Optionally, an omnidirectional antenna is included for initially establishing a wireless connection with another wireless device, such as an access point. A parameter indicative of signal quality, such as throughput or received signal strength indication (RSSI) is determined by polling with each antenna sector to establish a prioritized candidate list. If a receive Trigger becomes active in response to a parameter falling below a threshold level, a new candidate sector is selected from the current list based upon a next-best signal quality. The directionality of the multi-sector antenna provides a substantially higher data rate compared to that of the conventional omnidirectional antenna.

20 Claims, 10 Drawing Sheets

U.S. PATENT DOCUMENTS

| | | |
|---|---|---|
| 2002/0132643 A1 | 9/2002 | Chang et al. |
| 2003/0214453 A1* | 11/2003 | Downs ........................ 343/867 |
| 2004/0114535 A1* | 6/2004 | Hoffmann et al. .......... 370/252 |
| 2005/0014533 A1 | 1/2005 | Cave et al. |
| 2005/0206564 A1 | 9/2005 | Mao et al. |
| 2005/0242993 A1 | 11/2005 | Hein |
| 2006/0040709 A1 | 2/2006 | Adachi et al. |
| 2006/0071794 A1 | 4/2006 | Sayers et al. |
| 2006/0073850 A1* | 4/2006 | Cha et al. ................. 455/562.1 |
| 2006/0139833 A1 | 6/2006 | Ranta et al. |

OTHER PUBLICATIONS

J. De Los Santos "Introduction to Microelectromechanical (MEM) Microware Systems", Artech House, pp. 167-168 and 193, 1999.

Krazit, Tom "Smart Antennas to Expand Wi-Fi Range" Computerworld, Dec. 22, 2003, Copyright 2004 Computerworld, Inc. http://www.computerworld.com/printthis/2003/04,814,88487,00.html.

Office Action mailed Mar. 28, 2007, cited in related U.S. Appl. No. 11/027,748.

Office Action mailed Jul. 18, 2007, cited in related U.S. Appl. No. 11/027,748.

Notice of Allowance mailed Sep. 14, 2007, in related U.S. Appl. No. 11/045,687.

* cited by examiner

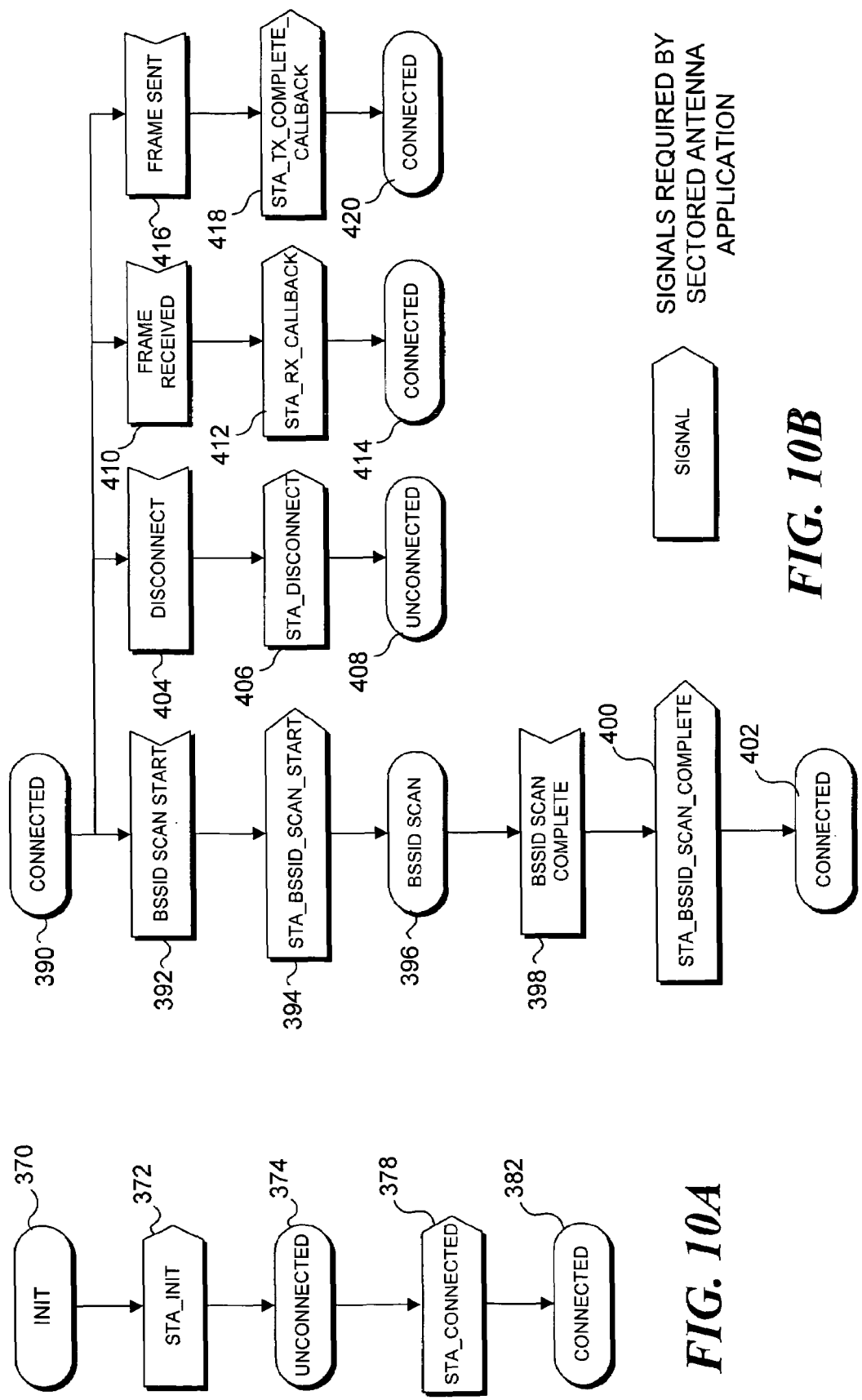

CONTROL OF A MULTI-SECTORED ANTENNA SYSTEM TO IMPROVE CHANNEL EFFICIENCY

FIELD OF THE INVENTION

The present invention generally pertains to control of an antenna used on a wireless network, and more specifically, to control of a multi-sector antenna that is coupled to a wireless device and can be controlled to communicate with another wireless device in a direction selected from a plurality of different directions.

BACKGROUND OF THE INVENTION

As an increasing number of computer users install wireless networks that meet the Institute of Electrical and Electronics Engineers (IEEE) 802.11 specifications in their homes and workplaces, it has become apparent that the performance (i.e., range and data rate) of such systems often fails to meet their expectations. Structures built of stone or brick, or which contain blocking interior elements, such as a fireplace, mirror, refrigerator, or other large metal or masonry furnishings, often cause problems in achieving adequate RF coverage at a desired data throughput. Throughput can be very important when the signal being conveyed is streaming video or other multimedia signal that cannot be interrupted or delayed without readily discernible adverse effects. The actual data rate that can be achieved quickly decreases as the distance between wireless communication devices and other factors reduce the received signal strength of the wireless transmissions. Also, the reception at a client device can be disrupted as a person or other object moves through the signal path to the access point, or if the client device, which is often a laptop or other portable computing device, moves even a few centimeters. Wireless devices attempt to minimize the effects of such disturbances to the signal path by using two antennas and a diversity switch that is controlled to automatically select the antenna providing the better signal strength, but on a laptop wireless card, the two antennas are only 2-3 cm apart, so the benefit is not as great for more significant disruptions in the signal path.

Existing IEEE 802.11 technologies retransmit data packets to compensate for signal fades that cause data packets to be corrupted or dropped during transmission. Packet retransmission is not particularly evident to users when they perform batched operations, such as browsing web pages. A page that loads two seconds slower or faster on a wireless laptop, depending upon radio conditions and/or signal strength, is typically not evident to users. In contrast, users are cognizant and intolerant of pauses in a streaming audio or video feed that occur while the system attempts retransmission. Consequently, software designers of systems that use wireless links often provide megabyte-sized jitter buffers to temporarily hold data for retransmission/reception in an attempt to prevent noticeable pauses or dropouts. However, these buffers cause a lag in the media data feed (latency), increase memory requirements, and generally make a wireless system more complex than is necessary.

Frequently, the only way to achieve a desired coverage and throughput in an office or home is to add more access points so that the distance and/or intervening structural elements between the access points and the clients devices are reduced, which means higher wiring costs to run Ethernet cabling to the additional access points and greater equipment costs for each added access point. Increasing transmitter power is typically not an option due to regulatory limitations and/or because significantly increased power consumption is not acceptable for a battery powered side of a link. As an alternative to adding more access points, significant performance improvements might be achieved by providing any existing access point and/or client device with the ability to focus RF energy in an appropriate direction, so that the energy is only transmitted or received in the direction required, rather than being directed or received by one of the more conventional dual omnidirectional antennas used on most commercially available wireless access points and client devices.

The benefits of controlling RF energy with a directional antenna in this manner are well known. However, the direction in which the RF energy needs to be transmitted or received is not fixed in most wireless systems, because a fixed access point must be able to maintain communications with moving client devices, or communicate with client devices that are located at different positions scattered around the access point. A fixed directional antenna is therefore only an acceptable solution to improve the gain of the wireless communication signal in systems where the devices communicating with an access point or with each other are fixed and the link between the devices is limited to the fixed direction. Alternatively, some commercial systems will use a plurality of wireless transceivers, each coupled to a different directional antenna that is directed toward a fixed wireless device. Such systems are generally too costly for home or small business use, however.

Electronically and mechanically steerable antennas have been used for decades in military and industrial applications to improve the range of radio communications links and the range of radar systems. Unfortunately, these systems are typically large and very expensive, and consequently, have generally not appeared in consumer products. More recently, electronically steerable antenna technology has been used at cellular telephone network base stations to improve channel capacity and range. This technology is also beginning to appear in commercial access points intended for installation in large scale commercial applications, such as at airports or in universities, but suitable systems still cost thousands of dollars. A multi-sector antenna is another form of steerable antenna and includes a plurality of sectors, each of which can transmit and receive in a different direction, i.e., perpendicular to the face of the sector.

Clearly, a more affordable approach is needed that can provide most of the benefits of these more expensive and complex systems that have been developed for steering an antenna, but at a reasonable cost level that is acceptable for consumer products of this type. Such a product should control selective switching of the antenna beam direction as needed to maintain the best communication link. For example, a client device provided with a relatively low cost multi-sector antenna or other steerable antenna should be able to control the antenna to achieve a much higher data rate when communicating with an access point, by selecting the best direction of the steerable antenna for the communication link. The best or preferred direction can change due to changes in the signal path, so it would be desirable to automatically detect when any deterioration of the signal has occurred and automatically select a new preferred direction for the communication link.

SUMMARY OF THE INVENTION

Thus, the present invention was developed to achieve the benefits of a directional antenna, without the problems noted above. Instead of using a plurality of different directional antennas and a different transceiver for each directional antenna, the present invention selectively controls the direction used for communication by employing a multi-sector antenna that is steerable in regard to the direction in which it transmits and receives RF wireless signals. This antenna is electronically steered so that a selected sector is activated (or so that the beam of the antenna is steered in a selected direction). The selected sector then transmits and receives in this direction, which is defined by a phased array antenna disposed on the sector. By selecting the sector associated with a direction that provides the optimal signal strength or some other criterion that is indicative of signal quality, it is possible to achieve a much higher data rate than is possible when transmitting or receiving in all directions at the same time (for a given transmit power). The direction in which communications occur can thereby be dynamically controlled to enable streaming video or other data that requires a higher data rate to be effectively communicated to or from the wireless device.

One aspect of the present invention is thus a method for controlling a direction in which RF signals are transmitted and received by a client device that is communicating with an access point in a wireless network. The method includes the steps of establishing a communication link between the client device and the access point. An initial direction that provides a best signal quality for the RF signals communicated between the client device and the access point is then selected using an antenna that is steerable to a plurality of different directions when transmitting and receiving the RF signals, such as the antenna noted above. Communication with the access point is thereby enabled in the initial direction by controlling the antenna to communicate RF signals in that direction.

The method preferably also includes the step of automatically determining a signal quality associated with communicating with the access point in each of a plurality of different directions, by steering the antenna to the different directions and detecting a value for the signal quality at each direction. A candidate list for prospective directions is preferably produced by automatically prioritizing the directions for communication with the access point based upon the signal quality detected for each direction. This candidate list can be created over time based upon a history developed while communicating, or can be initially developed and then updated, or as a further alternative, can be determined when it appears appropriate to try communicating in a different direction. For example, in response to a deterioration of communication with the access point in a current direction, a new direction for communication with the access point with the antenna can be selected from the candidate list. The new direction will be automatically selected based upon a priority of the new direction compared to the priority of other directions on the list.

In one embodiment, the step of establishing the communication link between the client device and the access point is carried out with RF signals conveyed by an omnidirectional antenna. The omnidirectional antenna can communicate with the access point at a lesser range than the antenna that can be steered, and the data rate of communication using the omnidirectional antenna will be substantially lower than that achieved with the antenna that can be steered to communicate in an optimal direction.

The signal quality that is used to determine the optimal direction or to order the directions on the candidate list can comprise at least one of a plurality of parameters. These parameters include a data throughput when communicating with the access point, a success in communicating data between the access point and the client device, a received signal strength indication (RSSI), a retry count accumulated before successfully transmitting data between the access point and the client device, an RSSI of a returned acknowledgement (ACK) from the access point, or a signal-to-noise ratio. As a further option, the signal quality can comprise an average determined over time of at least one of these parameters.

Another aspect of the present invention is directed to a wireless station that is controllable to transmit and receive wireless RF signals in a selected desired direction at a relatively high data rate compared to a data rate that would be achieved if the RF signals were transmitted and received omnidirectionally. The wireless station includes a wireless transceiver that is coupled to an antenna. The antenna is controllable to transmit and receive RF signals in a desired direction automatically selected from a plurality of different directions. A processor is coupled to the antenna to select the desired direction in which it is used for communicating with the RF signals, and a memory is coupled to the processor, for storing machine language instructions. The processor executes the machine language instructions, causing the processor to carry out functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 10A and 10B are flow charts respectively illustrating events passed to the sectored antenna application in the present invention when the wireless device connects to another wireless device, and to enable the appropriate antenna or direction to be selected, as well as collecting data to select candidate sectors or directions for a candidate list;

DESCRIPTION OF THE PREFERRED EMBODIMENT

Figure 1A:
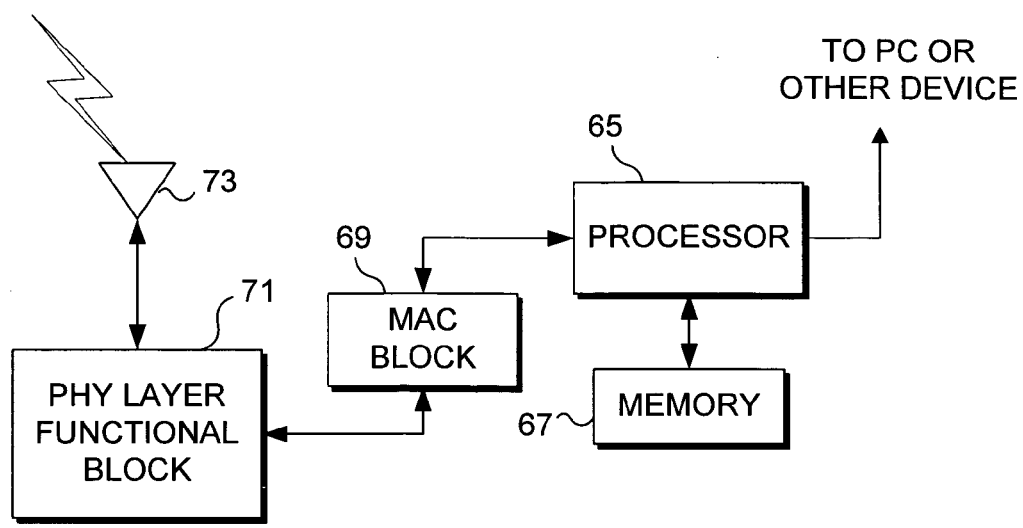
FIG. 1A (Prior Art) is a schematic block diagram of a client wireless device for communicating in an IEEE 802.11 wireless network, which is suitable for use in connection with the present invention.

FIG. 1A (Prior Art) is a simplified functional block diagram of a typical wireless device like that usable with the present invention. This wireless device includes a processor 65 that is coupled to a PC or other computing device (not shown) so that data device can be communicated to the processor. Processor 65 is coupled to a memory 67, which stores machine instructions for processing the data and for carrying out other functions. A media access control (MAC) block 69 and physical (PHY) layer functional block 71 are disposed between processor 65 and an RE omnidirectional antenna 73. Although a second omnidirectional antenna is typically provided, only one is used at a time. This conventional wireless device does not include a directional antenna, and it is subject to the problems noted above communicating over a wireless network. An example of one of these problems is illustrated in FIG. 1B (Prior Art), which is discussed below.

Figure 1B:
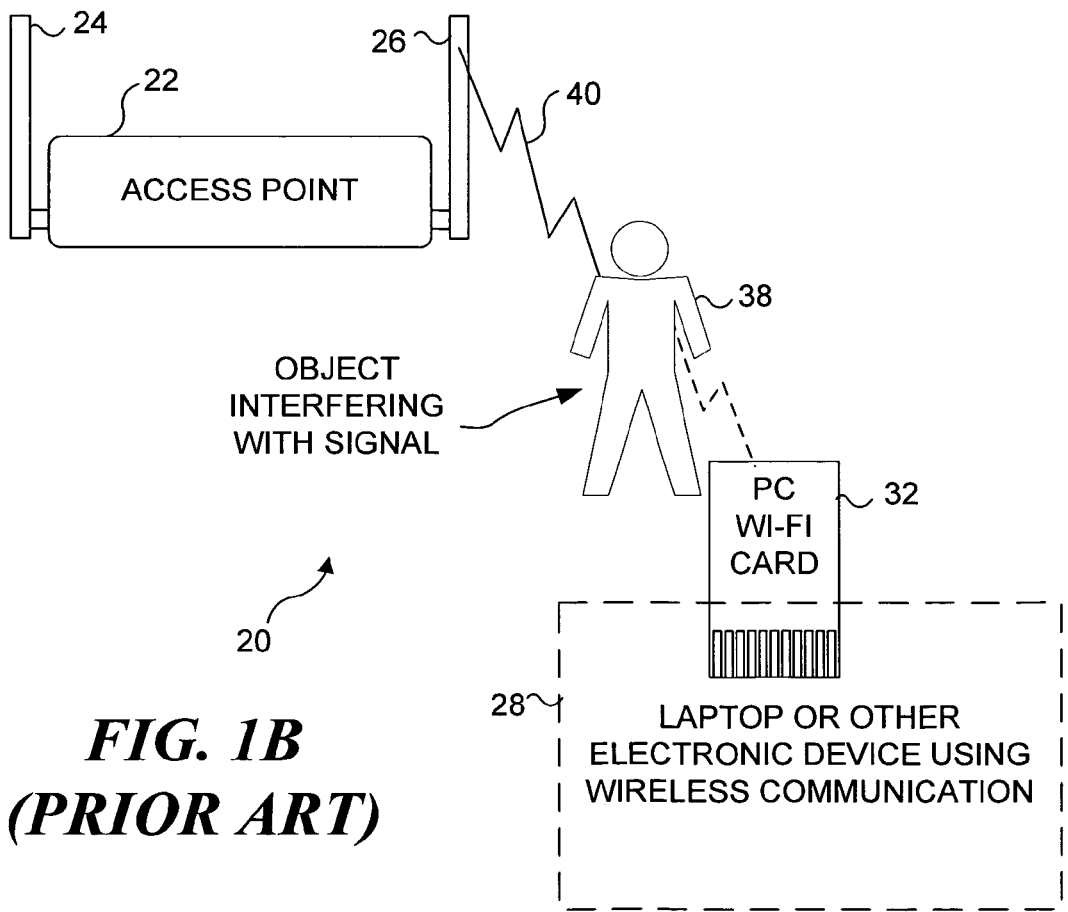
FIG. 1B (Prior Art) is a schematic block diagram illustrating wireless communication between an access point and a laptop client (or other electronic device), illustrating how wireless RF signals can be adversely affected by intervening objects that alter the RF wireless data signal path.

In FIG. 1B, one of the problems commonly experienced by prior art wireless devices is illustrated. A simple wireless network 20 includes an access point 22 that has two omnidirectional antennas 24 and 26. This access point communicates with a laptop 28. A PC WiFi card 32 is included in laptop 28 and has one or more internal antennas (not shown). Laptop 28 is able to move about access point 22, but is often used while generally fixed in position, relative to access point 22. An object 38 (such as a person) can move into the RF path between access point 22 and PC WiFi card 32, which can at least temporarily disrupt or at least reduce the signal strength of an RF signal 40, which is propagating between the two. As a result, laptop 28 will likely (at least temporarily) experience a substantially lower data rate for wireless communications between it and the access point. Similarly, if the person using laptop 28 moves it about, the change in position of PC WiFi card 32 over only a few centimeters can also substantially reduce the signal strength of the RF signal used for communication between the access point and the laptop due to the spatially constructive and destructive RF signal reflections from nearby objects, commonly known as multipath.

Access point 22 includes two omnidirectional antennas 24 and 26 to make use of diversity antenna circuitry in the access point, which selects the antenna employed during wireless communication to minimize loss of signal due to dropouts and interference by using the other antenna to receive a signal if the current antenna experiences a reduced signal quality. However, the diversity switching circuit includes two omnidirectional antennas and does not choose an antenna that can change a direction in which the RF signal will be transmitted or received. Similarly, although not shown, PC WiFi card 32 also includes two internal omnidirectional antennas used for diversity switching. The use of an omnidirectional antenna with a wireless transceiver means that a substantial portion of the RF signal that is transmitted by the selected antenna will be propagated in directions where no other wireless devices are located, thereby wasting the energy of the signal. Similarly, a signal is received from all directions, which limits the distance/data rate for received RF wireless data communications, compared to a directional antenna. Although laptop 28 could use a directional antenna aimed toward access point 22 for improving the quality of communications with it, the signal transmitted or received by such an antenna cannot accommodate changes in the signal path that occur due to objects moving into the path and cannot readily accommodate movement of the laptop (and antenna). The prior art generally teaches that it is desirable to use directional antennas only if the intended transmission and reception is in the direction favored by the directional antenna.

Figure 2:
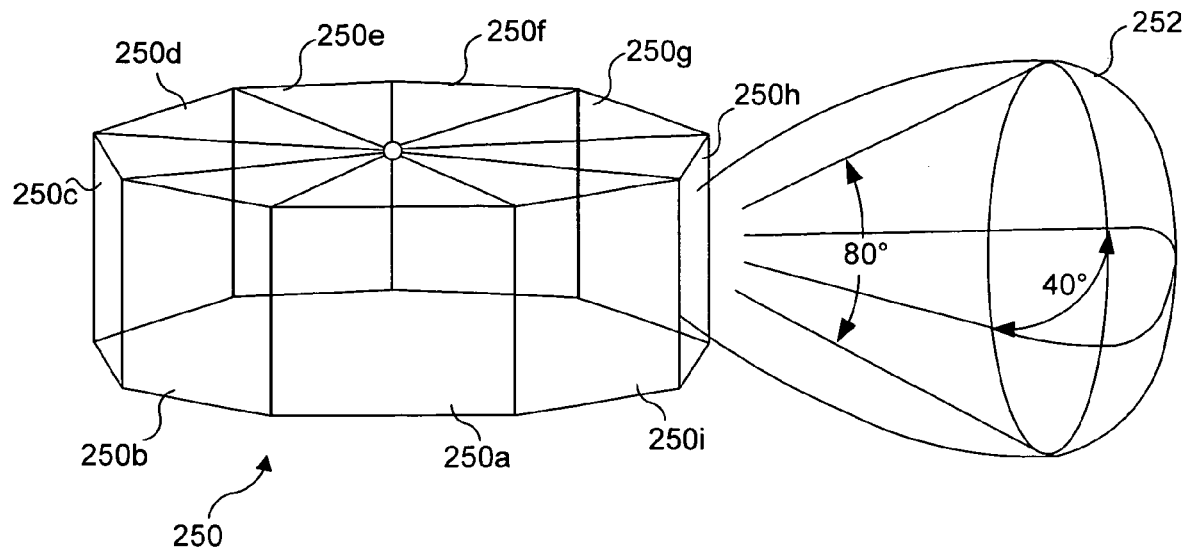
FIG. 2 is an isometric view of an exemplary multi-sector antenna for use in connection with the present invention, showing a theoretical beam pattern for one of the sectors.

To address problems such as these, the present invention employs a multi-sector (or steerable) antenna that is controllable to transmit/receive wireless RF signals in a desired direction, which can be selectively varied by controlling the antenna. An example of a multi-sector antenna system 250 is illustrated in FIG. 2, which illustrates a nine sector antenna system 250. Each sector comprises a generally planar panel 250a-250i, and each panel includes a phased array of antennas (details not shown) comprising patches of microstrip conductors. Panels 250a-250i have their ends coupled together to form a polygon with nine sides. Since the phased array antennas on each panel are always driven with substantially the same delay, the beam produced by each panel is always substantially perpendicular to the outer surface or face of the panel, as illustrated by a graphical lobe 252. In this example, the beam width extends approximately 40° in the horizontal and about 80° in the vertical direction.

Although nine panels are used in this exemplary multi-sector antenna system, it is contemplated that either fewer or more panels could instead be used, so that the multi-sector or steerable antenna is more generally described as comprising N different panels, each of which is preferably configured to employ a phased antenna array on the panel to define a beam that is directed in a desired direction relative to the panel. Alternatively, fewer sectors or panels can be used and the beam can be steered to a desired direction by modifying the delay in the signal path used for the plurality of patches comprising the phased array on each panel. In this manner, the beam can be caused to deflect to the left or to the right of the perpendicular to the outer surface of the panel that is selected to be active, and the panel selection and beam direction can be controlled by the present invention. It is also contemplated that the beam direction can be controlled in three dimensions, by adding vertical control of the beam to each panel by including additional panels above and below the panels directed in the horizontal direction or additional phased array patches on each panel to steer the beam produced by a panel in the vertical direction. Thus, the present invention can control both the active panel and can optionally control the relative delay used to drive the patches comprising each phased array to determine the direction in which the selected sector or panel transmits and/or receives a wireless RF signal. Further details of the circuitry for steering a multi-sector antenna are provided in a commonly assigned U.S. patent application Ser. No. 11/027,748, entitled "Electronically Steerable Sector Antenna," filed on Dec. 30, 2004, the drawings and specification of which are hereby specifically incorporated herein by reference. Also, another commonly assigned and related application. Ser. No. 11/045,687, entitled "Multi-Access System And Method Using Multi-Sectored Antenna," (MICR0573) filed Jan. 28, 2005, should be referenced for details related to using a multi-sectored antenna in connection with an access point.

Figure 3:
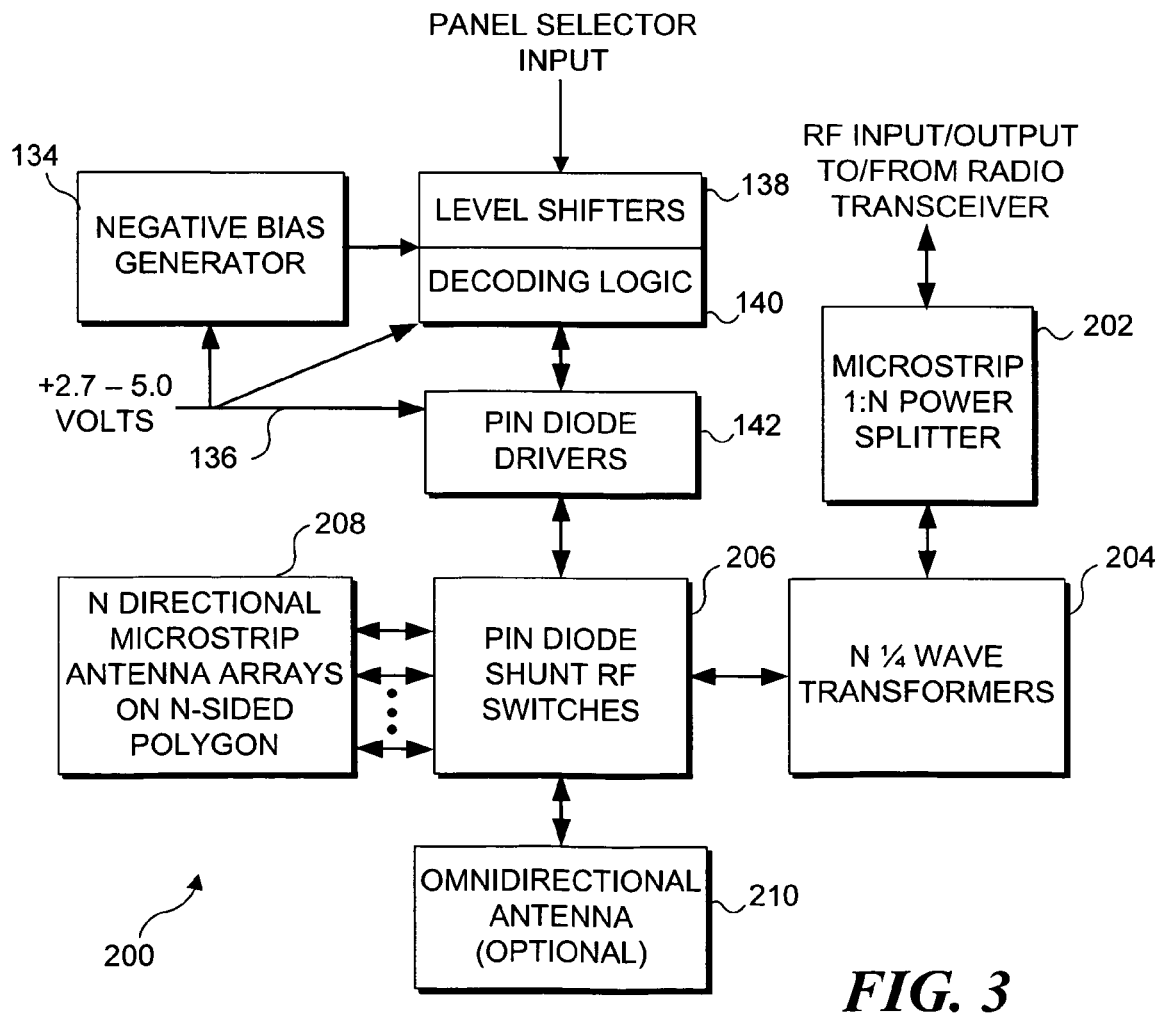
FIG. 3 is a functional block diagram of the electronic components for one panel or sector of the multi-sector antenna of FIG. 2 (also including a block for an omnidirectional antenna)

FIG. 3 illustrates a schematic block diagram 200 for multi-sector antenna system 250 that shows the component used on each panel of the multi-sector antenna. A negative bias generator 134 receives a direct current (DC) voltage level of from about 2.7 to 5.0 volts on a line 136 and produces a negative bias, since the circuitry requires both positive and negative voltage level rails relative to a zero level. The output of negative bias generator 134 is applied to a level shifter 138 and to a decoding logic block 140, which receives a panel selector input to determine the sector or panel that is selected to transmit and/or receive wireless communications. The panel selector input can optionally be an analog DC voltage that controls a continuously steerable antenna, or a digital input value that selects a particular discrete antenna sector or panel as currently active, to control the direction of the antenna beam used for transmitting and/or receiving. The output of decoding logic 140 is applied to PIN diode drivers 142, which drive PIN diode shunt RF switches 206, thereby determining the sector or panel that will transmit or receive. It should be appreciated that some types of PIN diodes may not require the negative bias generator to achieve the desired performance, in which case this block and its functionality can be eliminated. In FIG. 3, a microstrip 1:N power splitter 202 is used to split the signal to and from the radio transceiver in regard to N–¼ wave transformers 204. These transformers are coupled to PIN diode shunt RF switches 206, which determine the specific one of the N directional microstrip antenna arrays or panels on the N-sided polygon that will be activated for transmitting or receiving the RF signal.

Optionally (and preferably), an omni-directional antenna 210 can be included to transmit and/or receive a signal to/from another wireless device and can be used for any communication with another wireless device when the substantially higher data throughput of the multi-sector antenna is not needed. However, the omnidirectional antenna will typically be used in the present invention (if included) when first establishing a communication link with another wireless device (such as an access point), by initially connecting with the other wireless device and authenticating so that the wireless link is formed.

Figure 4:
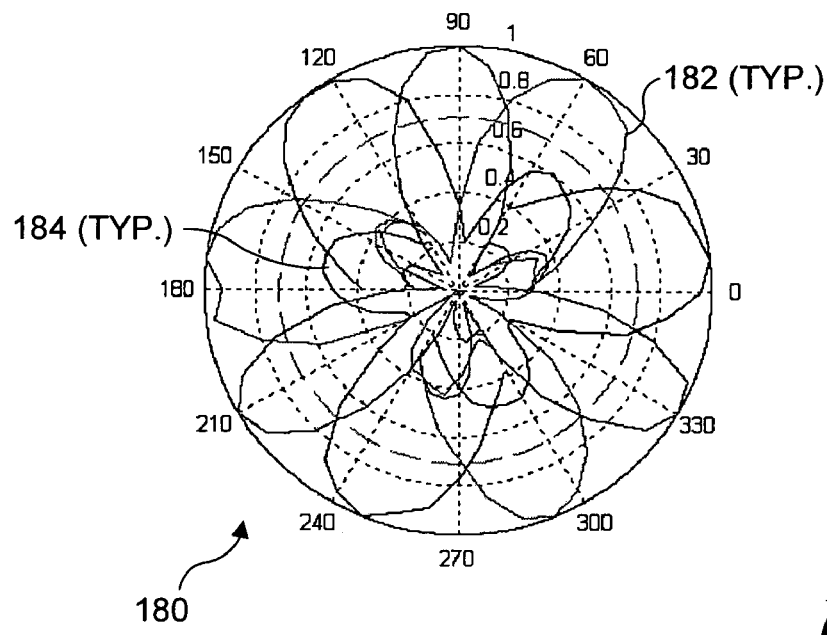
FIG. 4 is a composite empirically measured signal strength pattern for all nine beams of the multi-sector antenna of FIG. 2 (it being understood that only one beam at a time is active in normal use of this antenna)

The efficacy of the present invention in communicating with the exemplary multi-sector antenna discussed above has been shown by tests made of a prototype model, as illustrated by the transmitted signal strengths on a polar coordinate graph 180 that is shown in FIG. 4. This graph illustrates a plurality of different primary lobes 182 that are spaced apart from each other by approximately 40°. Although all nine primary lobes are illustrated for the graph of this data, perhaps giving the impression that they occur simultaneously, each of these lobes was separately measured at a different time, when the steerable antenna system was selectively driven to transmit only in the direction of that lobe. Also shown are the signal strengths of secondary side lobes 184. From this graph, it will be apparent that the multi-sector antenna system can be controlled to selectively determine a beam direction for transmission or reception of an RF signal, to provide a relatively high transmission rate in the selected beam direction, which can enable high quality communication of streaming video and other data that require a higher data rate.

Figure 5:
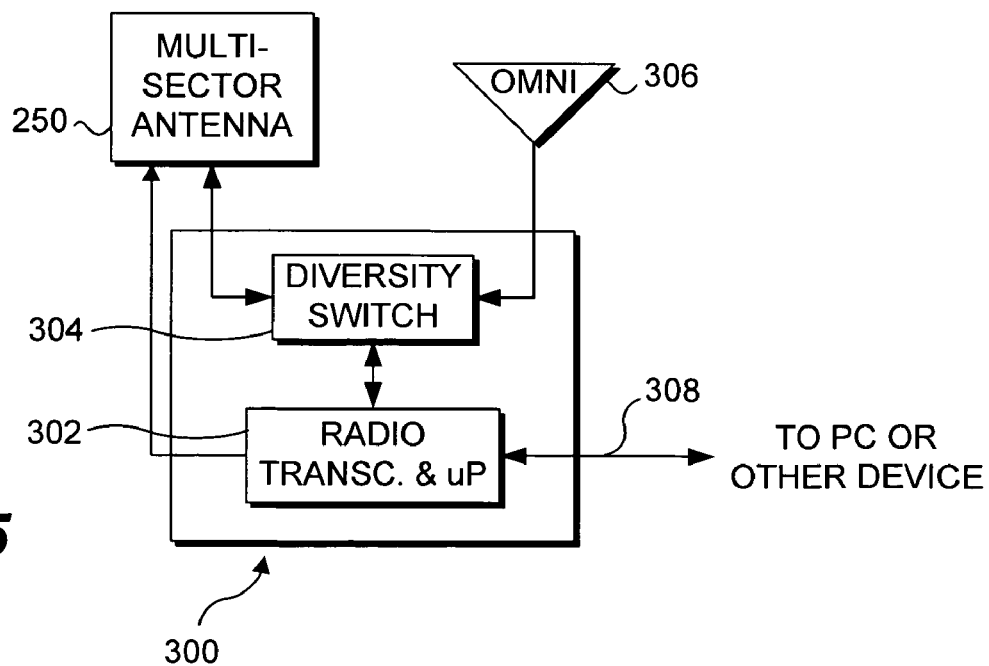
FIG. 5 is a functional block diagram of a wireless device that is usable with the multi-sector antenna (and an omni-directional antenna) in connection with the present invention.

FIG. 5 is a functional block diagram of the present invention, illustrating how a wireless device 300 (such as a client device in a wireless network) is configured to work with multi-sector antenna system 250. Just as in a prior art wireless device, the present invention includes a radio transceiver and microprocessor 302 that is coupled to a diversity switch 304 (often included in most wireless devices conforming to the IEEE 802.11 specification). Diversity switch 304 is only used if an optional omnidirectional antenna 306 is employed along with multi-sector antenna system 250. However, unlike in the prior art wireless devices, diversity switch 304 is used in the present invention for selectively connecting radio transceiver and microprocessor 302 to either the multi-sector antenna system or the omnidirectional antenna and not to one of two different omnidirectional antennas. A lead 308 connects radio transceiver and microprocessor 302 to a PC or other computing device (not shown).

Figure 6:
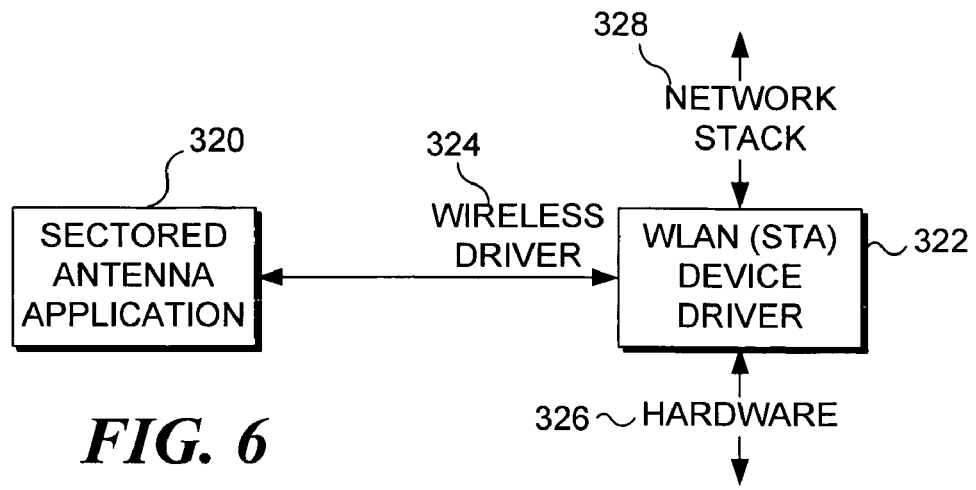
FIG. 6 is a software context diagram of the present invention.
Figure 7:
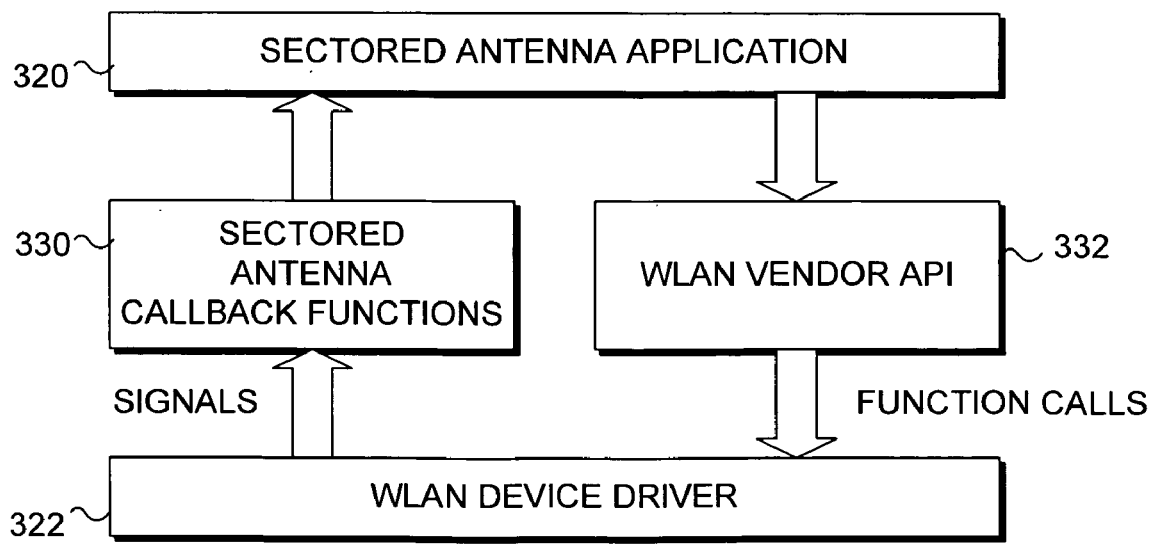
FIG. 7 is a functional block diagram illustrating the use of a vendor API and callback functions for controlling the multi-sector antenna.

FIG. 6 is a software context diagram illustrating the relationship between a sector antenna application 320, which is executed by the microprocessor included within the wireless device of FIG. 5, and other components of the system. A wireless local-area network station (WLAN STA) device driver 322 interfaces with the sectored antenna application through a wireless driver 324. The device driver is also interfaced to a network stack 328 and to other hardware components 326 of the system. In this system, as shown in FIG. 7, the software algorithms are implemented to interface to an application program interface (API) that includes a WLAN vendor API 332 providing vendor interface functions that are required to be implemented in the wireless device driver and which are available to the sectored antenna application. IEEE 802.11 events from WLAN device driver 322 are conveyed as signals to sectored antenna callback functions 330. The sectored antenna callback functions provide a mechanism for the wireless driver to signal and pass information to sectored antenna application 320.

Figure 8:
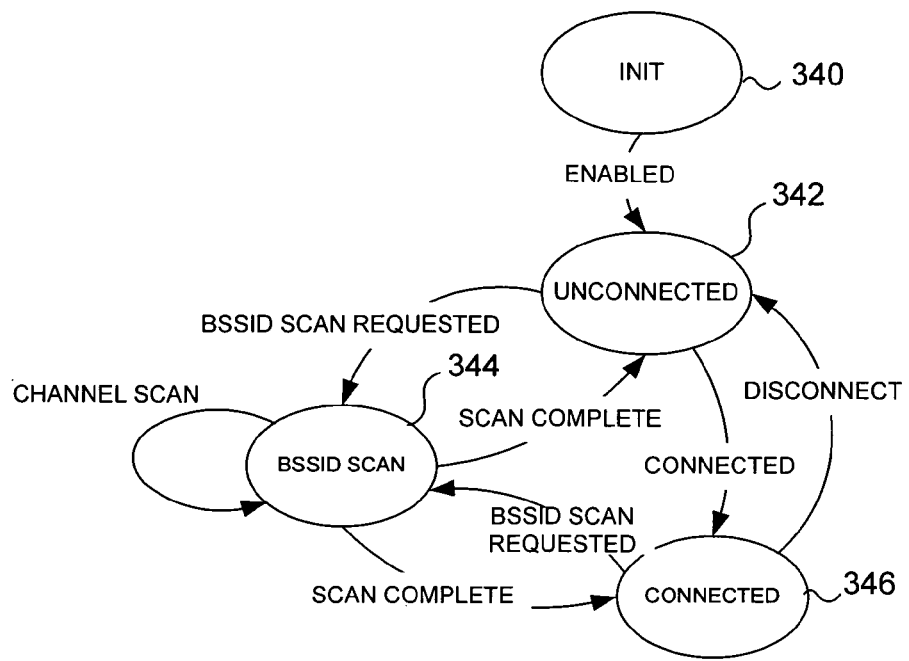
FIG. 8 is a state diagram for the present invention that illustrates its conformance to IEEE 802.11 standards with respect to scanning and association procedures.

To better understand how the present invention operates to control multi-section antenna system 250, it will be helpful to review several state diagrams and flowcharts shown in the drawing and discussed below. The present invention is implemented so as to ensure that the wireless device still adheres to the IEEE 802.11 specification with respect to scanning and association procedures. FIG. 8 represents an overview state diagram for the wireless device in accord with the present invention. In an "Init" state 340, the wireless device is awaiting an enable command from the PC or other computing device. Once this enable command is received, it changes to an "Unconnected" state 342 in which it is not connected to another wireless device, but is actively searching for any base station system (BSS). In this state, the wireless device will process management requests from a user and BSS identification (BSSID) scan results. In the event that a required service set identifier (SSID) is found, the wireless device will attempt to associate and authenticate with the other wireless device using accepted IEEE 802.11 procedures. If provided, the omnidirectional antenna is used in this state.

In a BSSID scan state 344, the wireless device performs an active or a passive channel scan on selected IEEE 802.11 channels. For example, in the IEEE 802.11g specification for the U.S., there are 11 possible channels on which wireless RF communications can be undertaken between two wireless devices. When performing a channel scan, a client wireless device using the present invention will send probe requests on the omnidirectional antenna and dwell for a short scan time period awaiting a probe response on the current channel. If a probe response is received within the short scan time, the client device will dwell on the omnidirectional antenna for a long scan time to collect multiple responses. Preferably, the short scan time is approximately equal to 20 ms and the long scan time is approximately equal to 100 ms. While the BSSID scan state could be implemented with the multi-sector antenna if the omnidirectional antenna is not provided, it will then be necessary to scan all of the available channels using each sector or panel, which will require the short scan time for each channel. The total channel scan for all sectors could easily take more than a second, depending upon the number of sectors included in the multi-sector antenna. Accordingly, it is generally preferable to use the omnidirectional antenna for this purpose, since only a single scan of the available channels need be done with the omnidirectional antenna. Assuming that the scan is successful in identifying a channel and initiating communications with another wireless device (such as an access point), the wireless device enters a connected state 346. In this state, the wireless device is linked in communication with the other wireless device and is enabled to transfer data at the relatively higher data rate using the multi-sector antenna system.

FIG. 10A is a flow chart illustrating the events required to be passed to the sectored antenna application when the wireless device connects to another wireless device in a wireless network, and FIG. 10B illustrates the events that are required to be passed to the sectored antenna application software to enable the appropriate antenna sector or direction to be selected and to collect appropriate statistics for making a selection of candidate sectors. In both diagrams, typical IEEE 802.11 logical state transitions and events are shown. In FIG. 10A, when the wireless device transitions from an Init state 370 to an unconnected state 374, a signal 372 labeled STA_INIT is called and is used to set the omnidirectional antenna to an active state. At this time the wireless device is not connected to another wireless device, such as an access point but is actively searching. When the wireless device transitions from the unconnected to a connected state 382, a signal 378 labeled STA_CONNECTED is called to inform the Sectored antenna Application.

FIG. 10B describes typical IEEE 802.11 events that occur while a wireless device is in a connected state 390. A block 392 labeled BSSID SCAN START illustrates that the wireless device has received a request to start a BSSID scan. An event 394 labeled STA_BSSID_SCAN_START is signaled to the sectored antenna application. This event is called before a BSSID scan is performed and is used to set the omnidirectional antenna active. Next, the BSSID scan is carried out in a step 396. A block 398 labeled BSSID SCAN COMPLETE illustrates when the BSSID scan is complete. At this point, an event 400 labeled STA_BSSID_SCAN_COMPLETE is signaled to the sectored antenna application and is used to select the continuation of the sectored antenna application algorithms. The wireless device remains in a connected state 402.

In the event that the wireless device is disconnected from an access point or other wireless device, as indicated at a block 404, an event 406 labeled STA_DISCONNECT is signaled to the sectored antenna application and is used to set the omnidirectional antenna active. The wireless device is then in an unconnected state 408

When in connected state 390, receipt of a data frame, as indicated at a block 410, causes an event 412 to be called, which is labeled STA_RX_CALLBACK. This event is used to update the reception statistics for parameters such as RSSI and may be repeated for successive frames. The wireless device remains in a connected state 414. While in connected state 390, the wireless device can also transmit data. Thus, a transmit indication at a block 416, causes a data frame to be sent, which further causes an event 418 labeled STA_TX_COMPLETE_CALLBACK to be signaled to the sectored antenna application. This event is called after the transmission of a data packet so that the sectored antenna application is informed about the transmission of a data packet and can either be enabled or disabled. Further details regarding the events discussed above and how they are used with by the sectored antenna application are provided below in connection with FIGS. 11-14.

Downlink/Uplink Optimization Using Historical Sector Profiling

Event 412, STA_RX_CALLBACK, is used to gather received statistics, both for the RX trigger and for choosing antenna sector or direction candidates that can next be used for transmission or reception of a wireless RF signal. Event 418, STA_TX_COMPLETE_CALLBACK, is used to collect the statistics associated to the probes to determine a list of candidate sectors are their relative priority. All antenna sectors are probed periodically to determine a historical profile of the sectors. For example a preferred embodiment uses the RSSI of the ACKs from probes that have been transmitted by successive panels or in successive directions to determine the candidate list priority. The RSSI of the ACK is obtained when the TX callback event is fired. The RX call back is used to determine the trigger and validity of a chosen candidate.

For streaming video applications, throughput or data rate is a preferred approach for use as an RX trigger and for verifying the antenna panel or direction candidate chosen. A good signal data rate is important to efficiently receive such data at a relatively high rate, as required for an optimal user experience. Preferably, only a subset of the possible sectors or directions will be included as candidates when selecting a sector or direction. The time period used for maintaining a sector candidate list is preferably an order of magnitude greater than the measurement period that is used for throughput or data rate determination. In an exemplary preferred embodiment, the sector candidate list is updated at a time interval ranging from 100 ms to one second in duration, while the throughput or data rate for the RX trigger is updated every 10 ms.

Figure 9:
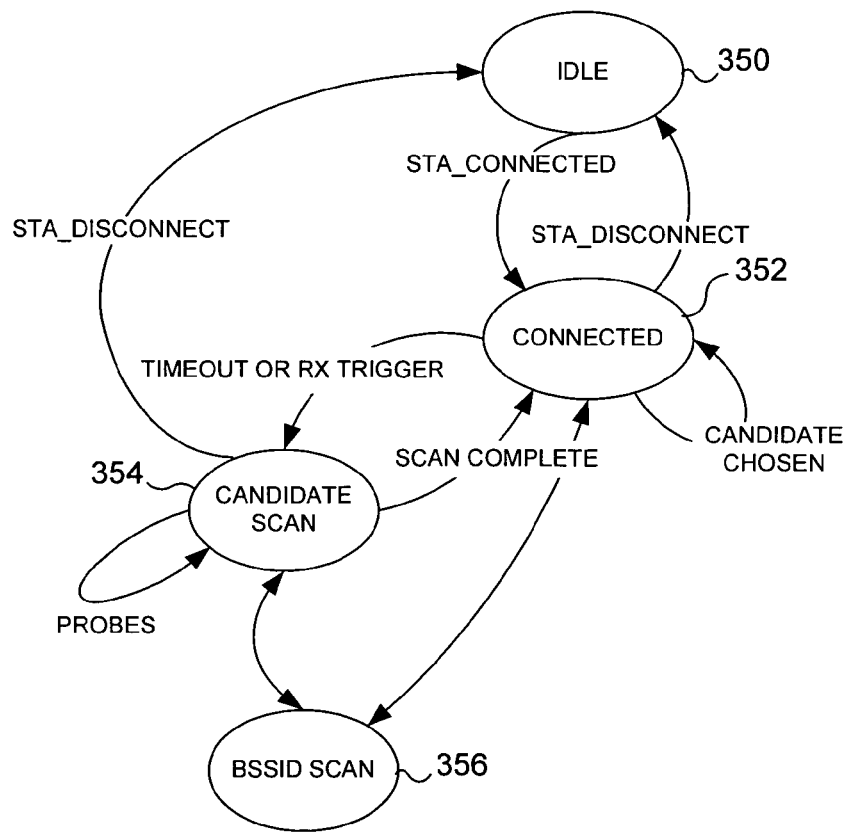
FIG. 9 is a state diagram illustrating the operation of the present invention once the multi-sector antenna is connected in communication with another wireless device.

An exemplary state machine governing the behavior of the sectored antenna application is illustrated in FIG. 9. Once the wireless device is connected to another wireless device in the network, the state machine shown in this Figure changes state as indicated. When not being used for transmission or reception, the wireless device is in an idle state 350. Upon being connected to another wireless device the state changes to a connected state 352. In this state, a candidate for a candidate list can be determined based upon statistics or parameters that are collected in the candidate scan state, as discussed in greater detail below. Following a timeout, the wireless device changes to a candidate scan state 354. In this state, probes are transmitted to determine candidate sectors or directions for the candidate list. If the wireless device becomes disconnected from the other wireless device, it returns to idle state 350. Once the scan using the probes for each sector is complete, the wireless device may switch to connected state 352. If a STA_BSSID_START event is signaled, the wireless device may change to a BSSID scan state 356, where a BSSID scan is carried out.

Overview of State Transitions

Figures 11, 12:
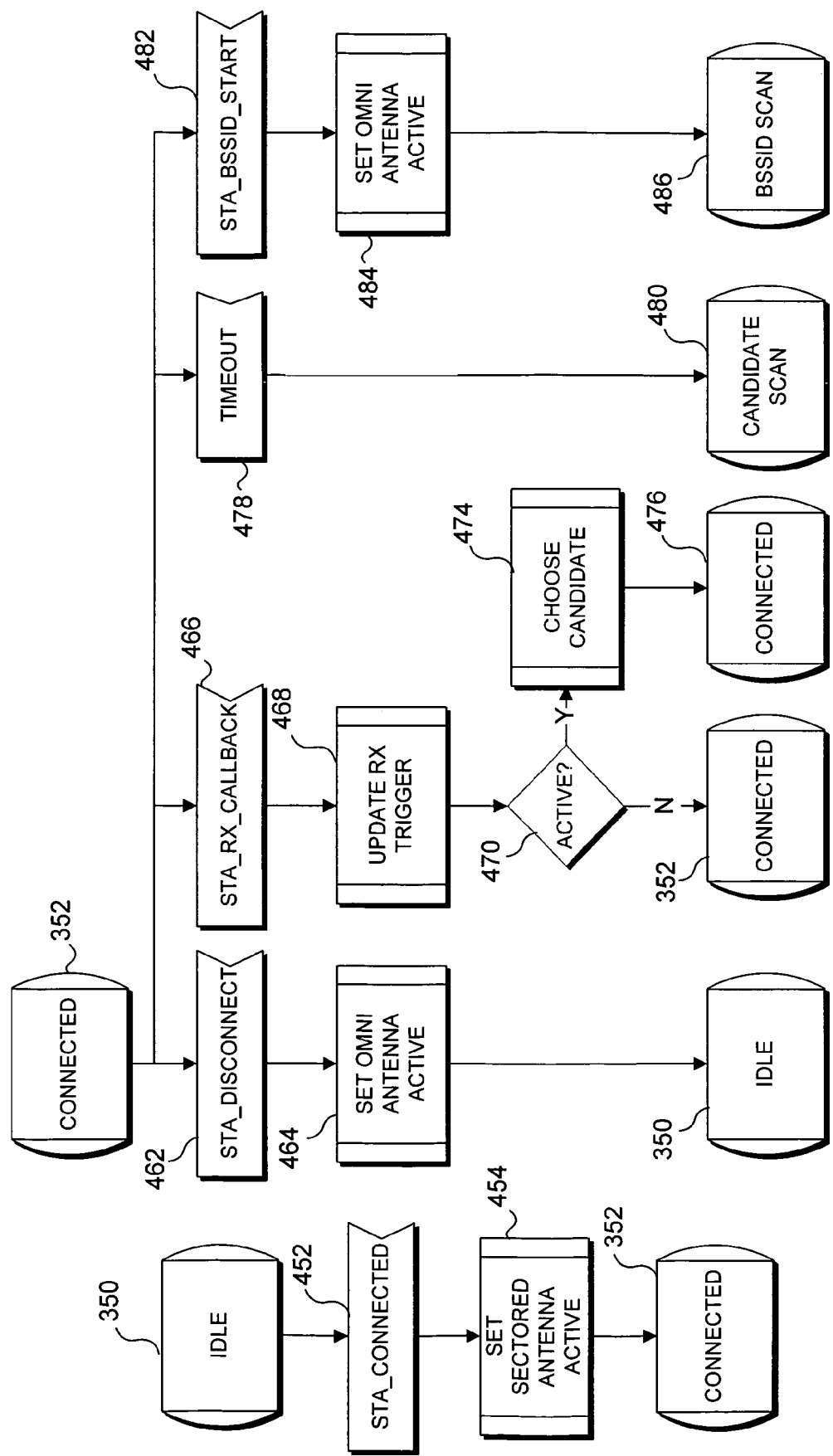
FIG. 11 is a state diagram illustrating an overview of state transitions.
FIG. 12 is a state diagram applicable when the multi-sector antenna is connected in communication with another wireless device.

FIG. 11 illustrates the state transitions for an idle state 350. An event 452 (which is corresponds to signal 378 in FIG. 10A) is called after the wireless device is connected to another wireless device such as an access point and is used to start the sectored antenna application algorithms. In a step 454, the sectored antenna is set active, and the state machine advances to connected state 352.

In FIG. 12, the state transitions for connected state 352 are illustrated. The wireless device may respond to being disconnected from the other wireless device as indicated by an event 462 (which corresponds to event 406 in FIG. 10B), by setting the omnidirectional antenna active, as indicated in a block 464. The wireless device then changes to idle state 350. Alternatively, the wireless device may receive a data packet as indicated by an event 466 (corresponding to event 412 in FIG. 10B), causing the update of the received statistics or parameters. These statistics or parameters are used for updating the RX trigger, as noted in a block 468. A decision step 470 determines if the RX trigger is active, and if it is, as noted in a block 474, the sectored antenna application chooses a candidate from among the subset of sectors or directions for use in transmitting or receiving data, and returns to a connected state 476. If the RX trigger is not active in decision block 470, the sectored antenna application remains in connected state 352.

While in connected state 352, the timeout event indicated in a block 478 may occur so that the candidate list can be updated. In this case, the wireless device changes to a candidate scan state 480.

Also, at predefined intervals, the wireless device may initiate a BSSID scan, as indicated in a block 482, causing the sectored antenna application to set the omnidirectional antenna as active, as noted in a block 484. The omnidirectional antenna is then used for BSSID scan state 486.

Figure 13:
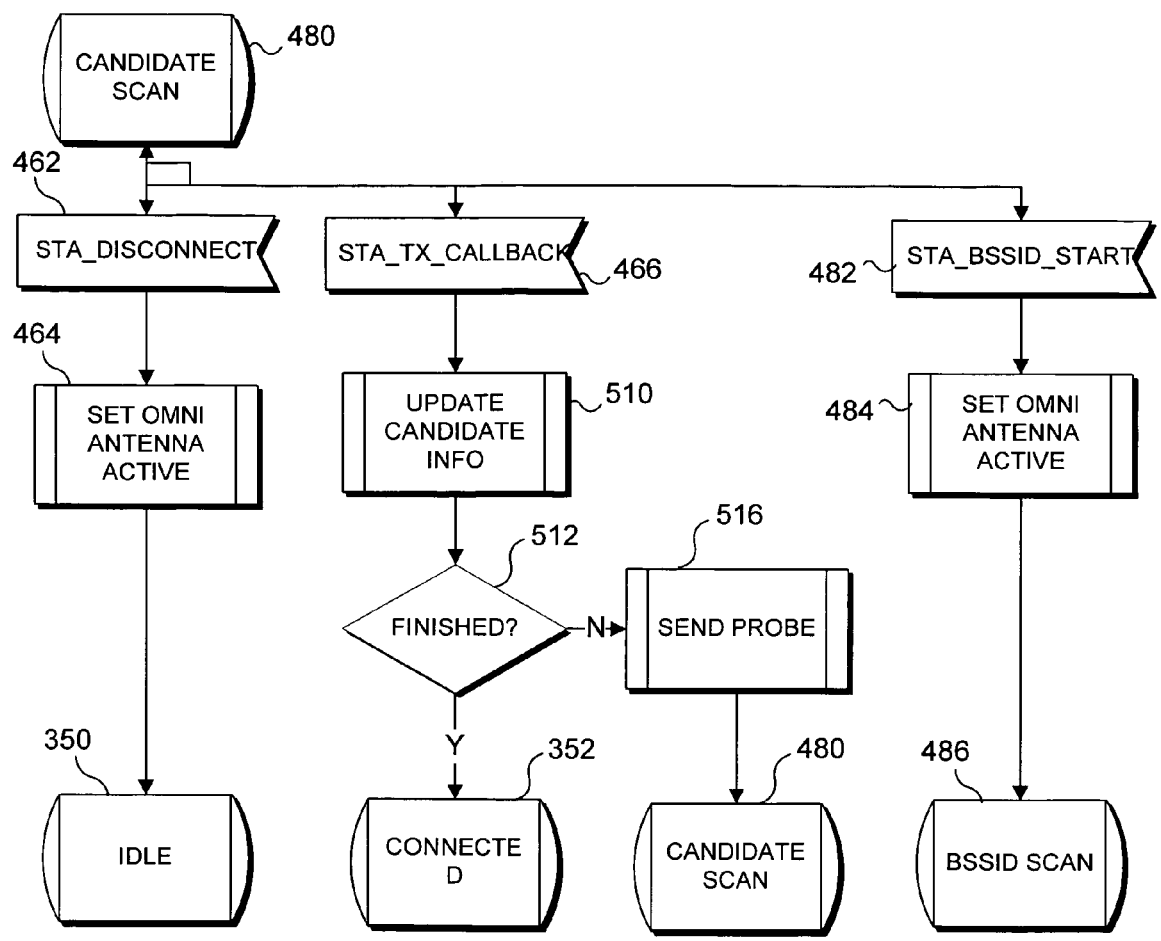
FIG. 13 is a state diagram applicable for a candidate scan.

FIG. 13 illustrates the transitions for candidate scan state 480. Upon determining that the wireless device has been disconnected in block 462, a block 464 sets the omnidirectional antenna active. The wireless device then enters idle state 350. Also, when probe transmissions have been completed in accord with event 466, the candidate list information is updated, as noted in a block 510. The candidate list can be updated based on a single current value for the parameter being evaluated to select each candidate (i.e., the RSSI of the returned ACK), or can be a running average of the values for that parameter. The last sector or direction used will preferably be pre-weighted to be disposed at the bottom of the candidate list, since poor communications using that sector or direction has been the basis for choosing a new candidate from the list. A decision step 512 determines if the transmission of probes on all of the prospective sectors or directions is finished, and if so, the wireless device enters connected state 352, the candidate list has now been updated. Otherwise, a probe is transmitted for the next sector or direction, as indicated in a block 516. The wireless device then remains in candidate scan state 480. Normally, after the wireless device has been connected to in a wireless network, blocks 482, 484, and 486 are only required for carrying out a BSSID scan if it is likely that there is more than one access point with which to connect in the wireless network. However, these blocks are required when the wireless device is first connected into a wireless network to find at least one access point with which to connect. Block 482 provides for starting the BSSID scan using the omnidirectional antenna, as noted in block 484. The wireless device then changes to BSSID scan state 486. The BSSID scan occurs in all states that look for a BSSID scan event.

Figure 14:
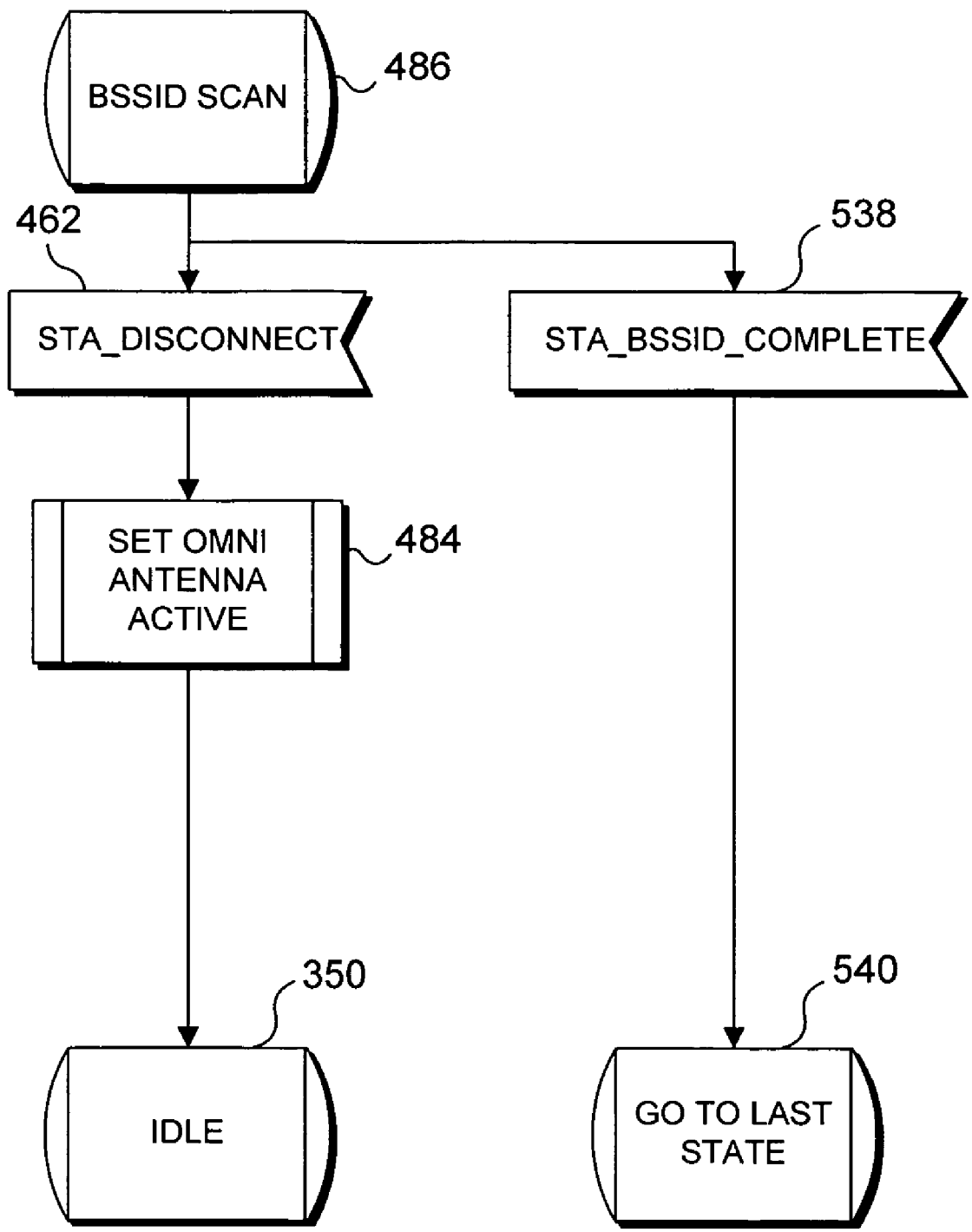
FIG. 14 is a state diagram for a scan state.

The state transitions for BSSID scan state 486 are shown in FIG. 14. Event 462 is called when the wireless device has been disconnected from the other wireless device or access point with which it was previously connected in communication. Block 484 then sets the omnidirectional antenna active, and the wireless device changes to idle state 350. Event 538 is called when the BSSID scan has been completed. The wireless device then reverts to its last state, in a block 540.

The wireless device will attempt to optimize its reception of downlink/uplink communications by detecting periods of bad reception and switching the active antenna sector or direction to an alternative sector or direction. It will be assumed that if the currently active antenna sector experiences a period of bad reception (or RF fade), then there may exist an alternative sector or direction that will provide better reception of the RF wireless signal. The candidates from which an alternative sector may be chosen are preferably determined by collecting historical data for those sectors or directions over time. This approach should give the best chance of choosing a successful candidate as the new active sector or direction to replace one that is now providing poor reception.

The application software monitors the incoming received data and generates RX Trigger Active and Inactive events. An RX Trigger On event signifies poor receive performance, while an RX Trigger Off event signifies acceptable receive performance. These Trigger events are used to drive the antenna sector selection state machine. When a different sector is chosen, the RX Trigger is reset. If an RX Trigger event is again generated, a different sector will be chosen, and this process repeats until a satisfactory sector or direction is determined.

Bad Reception Detection and Fade Detection

Several techniques can be used to determine the state of the RX Trigger, which is updated in the connected state in response to the STA_RX_CALLBACK event. These techniques include:

a determination of the Trigger based on throughput;
  success or failure when sending data packets (probes) to a connected wireless device (access point);
  an RSSI for an ACKNOWLEDGE (ACK) signal received as a consequence of data packets sent to the connected wireless device (access point);
  changes in the ratio of the receive rate to signal quality, where signal quality of the RSSI or signal-to-noise ratio of the received data packet, when the transmission rate of the other wireless device or access point is varied; and
  the packet error rate (PER) when the transmission rate of the other wireless device or access point is fixed.

In one preferred embodiment, throughput is determined over a 10 ms or longer period. Successive measurements are preferably analyzed to determine an RF fade rate. The specific number of measurements used for this purpose is a function of the data load and how the data are delivered over the wireless network. The measurements are averaged over a window, producing a result that is compared to a configurable threshold. The threshold is dependent upon the expected data load and is set by the sector antenna application software. In one preferred embodiment, the threshold is chosen to equal approximately 50% of the expected data load. For this embodiment, when the averaged throughput drops below this threshold, an RX Trigger On event is generated. For example, assuming a 6.6 Mbps data stream having a TCP/IP window size of 32 kB and using a conventional access point that is capable of 25 Mbps peak data delivery, 32 kB of data will be created every 37.88 ms. However, an access point is capable of consuming and transmitting these data packets in approximately 10 ms. Accordingly, there exists the possibility for 18 ms of dead time. To avoid experiencing this dead time, a sample size of five was chosen for the window of throughput samples. Empirically, this number of samples has been shown to be satisfactory for determining RX problems. The threshold is thus defined as 50% of the data load, which is equal to about 3.3 Mbps for the above-noted example.

As an alternative approach to calculating the RX Trigger based upon throughput, successive measurements in which the measurement reported a zero value can be counted. This approach is similar to the averaged window discussed above, but can be used in cases in which processor time is limited. If the successive count of zeros equals a maximum value, then RX Trigger is active. For example, if the throughput measured in each of x consecutive attempts is equal to 0 Mbps, the RX Trigger is set active.

Another method for selecting a candidate to be included on the candidate list of sectors or directions for the multi-sector antenna is based upon the success or failure of communicating when using a sector or direction of the multi-sector antenna. This parameter can be based upon the number of successes, where a small data frame (typically a null-data) communication was sent with n retries, or the number of retries before a successful communication occurred, or the RSSI of an ACK frame, or the rate at which communication was successful for a varying data rate, starting from a high data rate and decreasing to a minimum data rate. In each of these parameters, the number of retries, n, can range between 0 and a ShortRetryLimit that is set by the IEEE 802.11 specification.

The wireless device can monitor the received rate from the other wireless device or access point and the RSSI, to determine periods when the other wireless device is experiencing difficulties communicating with the wireless device. This approach is dependent upon the transmit rate algorithm used by the other wireless device or access point. The RSSI and/or SNR ratio is required to help distinguish between loss of communication or drops due to RF impairments, rather than transmission rate reductions that are implemented in accord with the algorithms controlling the other wireless device. For example, an access point may use its lowest basic rate for data frames transmitted for its own purposes, which are unrelated to the quality of the communication link. These low rate data frames should not cause the sectored antenna application executed by the wireless device to initiate an RX Trigger On event, based upon a perceived reduction in data rates, because the data rates were not cause by a need to change to a new sector or direction. In evaluating this parameter, it will be necessary for the application software to distinguish between a condition where there is a low rate and a high signal strength, and a condition where there is a low rate and a low signal strength. The ratio of rate/RSSI is used to overcome these problems.

Antenna Sector Candidate Selection

The sector or direction candidates are used by the sectored antenna application software selection procedure to identify an alternative antenna sector when the RX Trigger is active. This list of candidate sectors is ordered so that the most acceptable sector of the antenna is disposed at the top of the list, followed by the next most acceptable sector, and so forth. Periodically, the other wireless device or access point will be probed, as discussed below, using each of the sectors available on the multi-sector antenna. These results are averaged over time using a weighted average to produce an ordered list in a preferred embodiment of the present invention. Short, null-data frames are periodically sent on each antenna sector from the wireless device to the other wireless device or access point. The frames are retried if the transmission fails, up to a maximum number of retries. The sectors can thus be profiled based upon their success/failure rate, or the transmission rates of the probes, or on the RSSI of the returned ACK. If success/failure rate is used, the sectors are ordered based upon the number of retries that were used to probe the other wireless device successfully. A lower number of retries will place a sector higher in the ordered list, while a greater number of retries will cause the sector to be placed lower in the ordered list. If transmission rate of the probe is used to order the list, a transmission rate service will attempt to optimize the transmission rate on each sector of the multi-sector antenna, based on the success/failure of the transmitted packet to reach the intended recipient. The sectors of the antenna will be prioritized (or ordered) based on the highest TX rate, and then by the lowest retry count. If RSSI is used for this purpose, a weighted moving RSSI average of the returned ACK is applied to order the sectors of the multi-sector antenna on the list. Typically, a moving average RSSI window size includes from five to 10 samples.

Probe Synchronization

Figure 15:
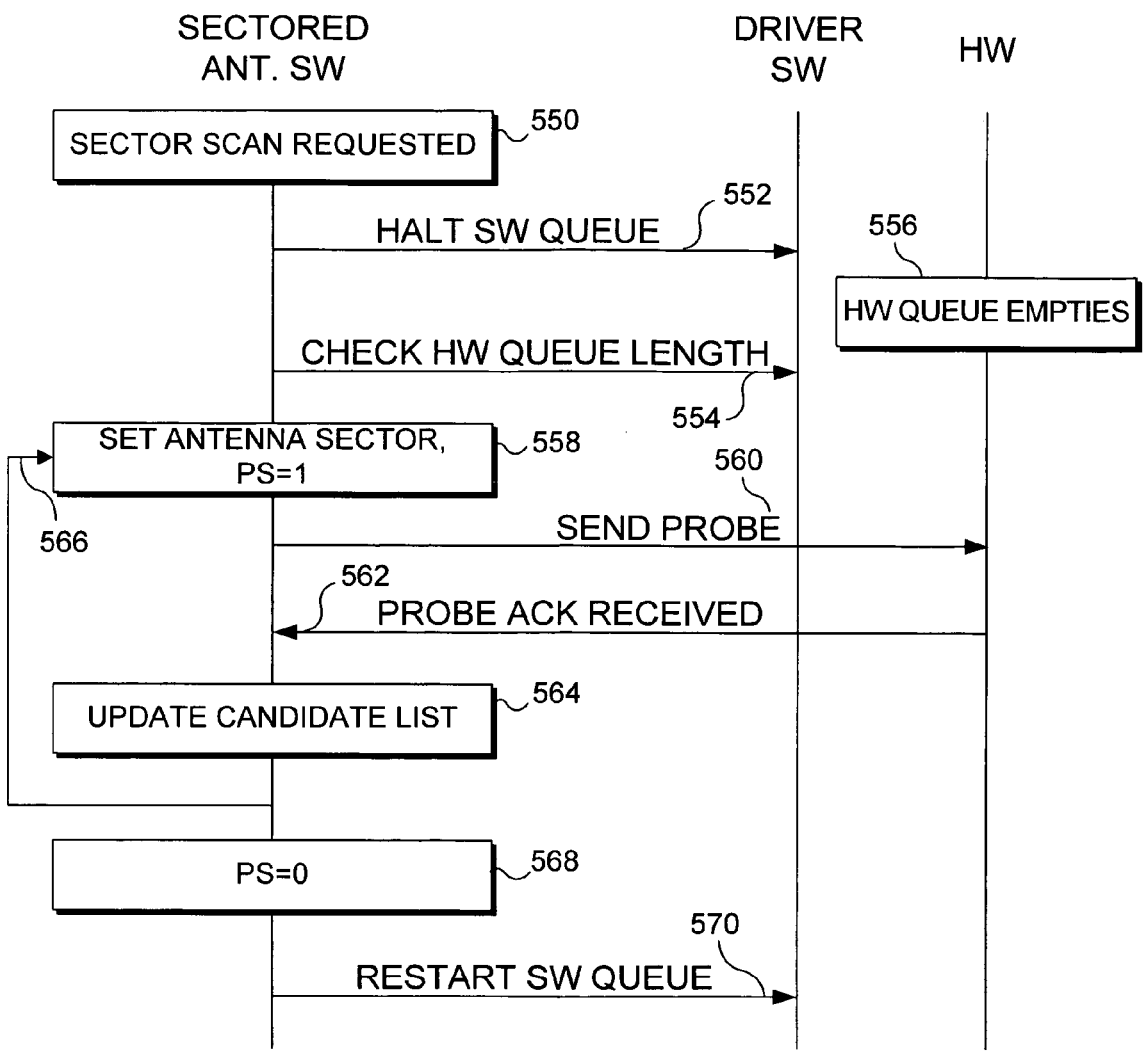
FIG. 15 is a schematic diagram illustrating the interaction between hardware and software in connection with scanning in the present invention.

To enable the sectored antenna application to send probes to another wireless device or access point using the available different antenna sectors/directions, the transmission of each probe must be synchronized with the switching of the multi-sector antenna to each different sector or direction. FIG. 15 illustrates how the sectored antenna application software and the hardware of the multi-sector antenna interact. A sector scan is requested by the application software in a block 550, which halts the application software queue, as indicated at 552, giving the hardware queue time to empty. The application checks the hardware queue length at 554 and waits until the hardware queue has emptied of data, as noted at a block 556. In a block 558, the application software sets a current antenna sector and sends a power save flag to the access point (or other wireless device). The application software then commands the hardware to send a probe to the access point using the current sector of the multi-sector antenna, as indicated at 560. Preferably, the probe is simply a short frame of null data, such as the IEEE 802.11 Null-Data frame. At 562, an ACK is received from the access point if the attempted probe communication was successful, or if not, the wait for an ACK to be received times out (after a predefined time interval has elapsed). Based upon the results of the probe, the candidate list is updated. If successful, the then current sector is added to the candidate list, along with a parameter indicating the signal quality for that sector. If all sectors have not yet been probed, the next sector (or direction) of the multi-sector antenna is used for sending the probe at 560. A loop 566 back through block 558 is repeated until all sectors (or a desired subset) have been used for the probe. A flag to disable the power save function is then sent with null-data (or actual data if available to be sent) to the other wireless device or access point in a block 568. As noted at 570, the application software queue is then restarted and communication proceeds with the top candidate on the candidate list (which has been ordered according to the signal quality for each of the sectors for which the probe was successful).

To minimize the time spent dwelling on each antenna sector, the probes will be queued as if there were high priority data packets to be transmitted by the wireless device. The transmit engine of the radio transceiver used in the wireless device will then transmit these null data packets used for the probes with a lower than normal contention window (CW) parameter (a procedure defined by the IEEE 802.11e specification).

Downlink/Uplink Optimizing Using Immediate Sector Profiling

Figure 16:
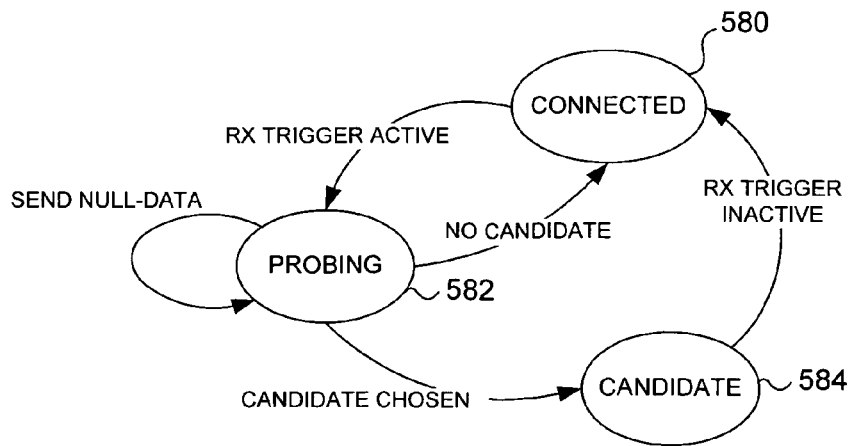
FIG. 16 is a state diagram for sector profiling.

In this alternative approach, the candidate list is maintained in a substantially different manner. When the RX Trigger becomes active, the other wireless device or access point is immediately probed using all antenna sectors. Based upon the results of these probes, a candidate is chosen. FIG. 16 illustrates a state diagram showing the changes necessary to perform immediate sector profiling in this manner. The immediate sector profiling uses the RSSI of probes that are sent on each of the antenna sectors. When it is necessary to use a different sector, all sectors are immediately poled to create a current candidate list based on current averages of a parameter, rather than using a historically developed candidate list that was determined over time.

Referring to FIG. 16, a connected state 580 can change to a probing state 582 if the RX Trigger becomes active. When the RX Trigger On event becomes active, a power save flag is sent to the other wireless device, transmissions are halted, a probe timeout elapses, and probing begins. In probing state 582, the wireless device sends null-data using each sector of the multi-sector antenna. At each time out, the application software changes to another sector and sends another frame of null-data. Parameters such as success/failure, rate, and RSSI are updated for the current sector. After all sectors have been probed, the candidate list is checked, and if the list contains a better sector than the current sector, a change is made to the best candidate sector, and the RX Trigger is reset. Based upon these immediate results, a new candidate 584 is thus chosen. However, if the candidate list is empty after all probes have been sent, the RX Trigger is reset, and reception continues using the original sector.

Signal quality, whether determined historically over time, or immediately when selecting a new sector, can be based on one or more of a number of different parameters. These parameters include a data throughput over the communication link; a success in communicating data over the communication link; a received signal strength indication (RSSI); a retry count accumulated before successfully transmitting data over the communication link; an RSSI of a returned acknowledgement (ACK) from the other wireless device; or a signal-to-noise ratio. It is also contemplated that a running average determined over time of at least one of these parameters can be used to assess signal quality.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for conducting wireless radio frequency (RF) communications with a wireless device using a multi-sector antenna that is coupled to the wireless device and is able to transmit and receive an RF signal in a desired direction, with a relatively high gain, wherein the desired direction is selectable from a plurality of different directions in which the antenna can transmit and receive an RF signal, comprising the steps of:
   (a) associating the wireless device in a communication link with another wireless device;
   (b) determining a signal quality for RF communications with the other wireless device using the antenna, for each of at least some of the plurality of different directions; and
   (c) based upon signal qualities determined, selecting an initial desired direction for the antenna to be used for communicating with the other wireless device, the initial desired direction being selected by evaluating the signal qualities that were determined to select a direction in which a value of the signal quality was optimum.

2. The method of claim 1, further comprising the steps of:
   (a) determining a candidate list of directions for transmitting and receiving RF signals while communicating with the other wireless device with the antenna, based upon the signal qualities determined for at least some of the different directions, wherein entries in the candidate list are prioritized based upon the signal quality in the different directions; and
   (b) in response to a change in the signal quality, selecting another direction from the candidate list, as a new desired direction for communicating with the other wireless device.

3. The method of claim 2, wherein the step of determining the candidate list of directions for transmitting and receiving RF signals with the antenna comprises the step of re-determining the signal quality for each direction of the antenna immediately before determining the candidate list, so that a current signal quality in each of the different directions is used in determining the candidate list.

4. The method of claim 1, wherein the signal quality comprises at least one of a plurality of parameters, including:
   (a) a data throughput over the communication link;
   (b) a success in communicating data over the communication link;
   (c) a received signal strength indication (RSSI);
   (d) a retry count accumulated before successfully transmitting data over the communication link;
   (e) an RSSI of a returned acknowledgement (ACK) from the other wireless device;
   (f) a signal-to-noise ratio;
   (g) an average determined over time of at least one of the parameters (a) through (f).

5. The method of claim 1, wherein the antenna comprises a multi-sector antenna and each different direction corresponds to a different sector of the multi-sector antenna, so the step of selecting the initial desired direction for the antenna comprises the step of selecting one of the sectors of the multi-sector antenna for communicating with the other wireless device.

6. The method of claim 1, wherein the step of associating the wireless device in the communication link with the other wireless device comprises the step of using an omnidirectional antenna to initially detect and authenticate with the other wireless device, the wireless device communicating with the other wireless device over the omnidirectional antenna at a relatively lower data rate than that used for communicating with the other wireless device in the initial desired direction using the antenna.

7. The method of claim 1, wherein the step of associating the wireless device in the communication link with the other wireless device comprises the step of scanning available communication channels in at least some of the different directions until a communication with the other wireless device is established on one of the communication channels.

8. A memory medium having machine instructions for carrying out the steps of claim 1.

9. A wireless station that is controllable to transmit and receive wireless radio frequency (RF) signals in a selected desired direction at a relatively high data rate compared to a data rate that would be achieved if the RF signals were transmitted and received omnidirectionally, comprising:
   (a) a wireless transceiver;
   (b) an antenna, comprising a multi-sector antenna, that is coupled to the wireless transceiver and is controllable to transmit and receive RF signals in a desired direction automatically selected from a plurality of different directions in which the antenna can be caused to transmit and receive the RF signals;
   (c) a processor that is coupled to the antenna to select the desired direction in which it is used for communicating with the RF signals; and
   (d) a memory coupled to the processor, for storing machine language instructions, the processor executing the machine language instructions, causing the processor to:
      (i) establish a communication link with another wireless device;
      (ii) determine a signal quality for RF communications conducted with the other wireless device using the antenna, for each of at least some of the plurality of different directions; and
      (iii) based upon signal qualities determined, select an initial desired direction for the antenna to be used for communicating with the other wireless device, the initial desired direction being selected by evaluating the signal qualities that were determined, to select a direction as the initial desired direction for which a value of the signal quality was optimum.

10. The wireless station of claim 9, wherein the machine language instructions further cause the processor to:
   (a) determine a candidate list of directions for transmitting and receiving RF signals, while communicating with the other wireless device using the antenna, based upon the signal qualities determined for at least some of the different directions, wherein the directions included on the candidate list are prioritized based upon the signal quality determined for each direction; and
   (b) in response to a change in the signal quality, select another direction from the candidate list as a new desired direction for communicating with the other wireless device.

11. The wireless station of claim 10, wherein the machine language instructions further cause the processor to re-determine the signal quality for each direction of the antenna immediately before determining the candidate list, so that a current signal quality in each of the different directions is used in determining the candidate list.

12. The wireless station of claim 9, wherein the signal quality comprises at least one of a plurality of parameters, including:
   (a) a data throughput over the communication link;
   (b) a success in communicating data over the communication link;
   (c) a received signal strength indication (RSSI);
   (d) a retry count accumulated before successfully transmitting data over the communication link;
   (e) an RSSI of a returned acknowledgement (ACK) from the other wireless device;
   (f) a signal-to-noise ratio;
   (g) an average determined over time of at least one of the parameters (a) through (f).

13. The wireless station of claim 9, wherein the antenna comprises a multi-sector antenna and each different direction corresponds to a different sector of the multi-sector antenna, and wherein the machine language instructions cause the processor to select one of the sectors of the multi-sector antenna for communicating with the other wireless device, where the sector that is selected transmits and receives in the initial desired direction determined by the processor.

14. The wireless station of claim 9, further comprising a switch that is coupled to an omnidirectional antenna, to the antenna, and to the wireless transceiver, the machine language instructions further causing the processor to active the switch so as to use the omnidirectional antenna to initially detect and authenticate with the other wireless device, the wireless station communicating with the other wireless device over the omnidirectional antenna at a relatively lower data rate than that used for communicating with the other wireless device in the initial desired direction using the antenna.

15. The wireless station of claim 9, wherein the machine language instructions further cause the processor to use the wireless transceiver and antenna to scan available communication channels in at least some of the different directions until a communication with the other wireless device is established on one of the communication channels.

16. A method for controlling a direction in which radio frequency (RF) signals are transmitted and received by a client device that is communicating with an access point in a wireless network, the method comprising:
   establishing a communication link between the client device and the access point;
   determining a signal quality associated with communication between the client device and the access point in each of a plurality of different directions with the use of an antenna, comprising a multi-sector antenna, that is steerable to the plurality of different directions when transmitting and receiving the RF signals;
   evaluating the signal qualities at each of the plurality of different directions and selecting, from the plurality of different directions, an initial direction that provides a best signal quality for the RF signals communicated between the client device and the access point;
   enabling communication with the access point in the initial direction by controlling the antenna to communicate RF signals in the initial direction.

17. The method of claim 16, further comprising:
   steering the antenna to each of said plurality of different directions;
   detecting a value for the signal quality at each of the plurality of different direction; and
   automatically prioritizing the plurality of different directions for communication between the client device and the access point based upon the signal quality detected for each of the plurality of different directions.

18. The method of claim 17, further comprising the step of responding to a deterioration of communication with the access point in a current direction by selecting a new direction for communication with the access point with the antenna, the new direction being automatically selected based upon a priority of the new direction compared to the priority of other directions.

19. The method of claim 16, wherein the step of establishing the communication link between the client device and the access point is carried out with RF signals conveyed by an omnidirectional antenna.

20. The method of claim 16, wherein the signal quality comprises at least one of a plurality of parameters, including:

(a) a data throughput when communicating with the access point;
(b) a success in communicating data between the access point and the client device;
(c) a received signal strength indication (RSSI);
(d) a retry count accumulated before successfully transmitting data between the access point and the client device;
(e) an RSSI of a returned acknowledgement (ACK) from the access point; (f) a signal-to-noise ratio;
(g) an average determined over time of at least one of the parameters (a) through (f).

* * * * *